(12) United States Patent
Yang et al.

(10) Patent No.: US 11,983,680 B2
(45) Date of Patent: May 14, 2024

(54) INTELLIGENT MONITORING SYSTEM FOR WASTE DISPOSAL AND METHOD THEREOF

(71) Applicant: CHASE SUSTAINABILITY TECHNOLOGY CO., LTD., Taipei (TW)

(72) Inventors: Yung-Fa Yang, Taoyuan (TW);
Tsung-Tien Chen, Taoyuan (TW);
Shao-Hsin Hsu, Taoyuan (TW);
Bo-Wei Chen, Taoyuan (TW);
Chia-Ching Chen, Taoyuan (TW);
Ming-Hua Tang, Taoyuan (TW)

(73) Assignee: CHASE SUSTAINABILITY TECHNOLOGY CO., LTD., Taipei (TW)

( * ) Notice: Subject to any disclaimer, the term of this patent is extended or adjusted under 35 U.S.C. 154(b) by 407 days.

(21) Appl. No.: 17/346,200

(22) Filed: Jun. 12, 2021

(65) Prior Publication Data
US 2022/0366379 A1 Nov. 17, 2022

(30) Foreign Application Priority Data
May 14, 2021 (TW) .................................. 110117554

(51) Int. Cl.
*G06Q 10/30* (2023.01)
*G06T 7/00* (2017.01)
(Continued)

(52) U.S. Cl.
CPC ............. *G06Q 10/30* (2013.01); *G06T 7/001* (2013.01); *G06T 7/20* (2013.01); *G06V 20/52* (2022.01);
(Continued)

(58) Field of Classification Search
CPC . G06T 7/001; G06T 7/20; G06T 2207/10016; G06T 2207/30232;
(Continued)

(56) References Cited

U.S. PATENT DOCUMENTS

| 9,948,902 B1 * | 4/2018 | Trundle | ................. G06V 20/52 |
| 2021/0192428 A1 * | 6/2021 | Heikkilä | ................. B65B 57/10 |
| 2023/0036534 A1 * | 2/2023 | Minagawa | ............... E02F 9/261 |

FOREIGN PATENT DOCUMENTS

| CN | 111861337 A | * | 10/2020 | |
| CN | 112087604 A | * | 12/2020 | |
| EP | 3830003 B1 | * | 9/2023 | ............ B65F 1/0033 |

* cited by examiner

*Primary Examiner* — Bobbak Safaipour
*Assistant Examiner* — Ashley L. Hytrek
(74) *Attorney, Agent, or Firm* — Chun-Ming Shih; HDLS IPR SERVICES

(57) ABSTRACT

An intelligent monitoring system for waste disposal and the method thereof are provided, which include a plurality of operational devices and stages. First, a transportation stage is performed to loading a transport vehicle with a waste so as to transport the waste to a disposal station for further treatment. A camera and a sensor for detecting abnormal conditions are installed any one of the operational devices or installed in the operational path of any one of the operational devices. The camera records the videos of the operational stages, captures the images from the videos and recognizes the images in order to determine whether the abnormal conditions occur in any one of the operational stages. Alternatively, the camera is triggered to capture the images and recognize the images after the abnormal conditions are detected by the sensor in order to determine whether the abnormal conditions actually occur.

5 Claims, 6 Drawing Sheets

(51) Int. Cl.
  *G06T 7/20*      (2017.01)
  *G06V 20/52*    (2022.01)
  *G06V 20/64*    (2022.01)
  *H04N 23/61*    (2023.01)
  *H04N 23/661*   (2023.01)
  *B65F 3/00*     (2006.01)
(52) U.S. Cl.
  CPC ............ *G06V 20/64* (2022.01); *H04N 23/61* (2023.01); *B65F 3/00* (2013.01); *G06T 2207/10016* (2013.01); *G06T 2207/30232* (2013.01); *G06T 2207/30252* (2013.01)
(58) Field of Classification Search
  CPC .......... G06T 2207/30252; G06V 20/52; G06V 20/64; H04N 23/61; B65F 3/00
  See application file for complete search history.

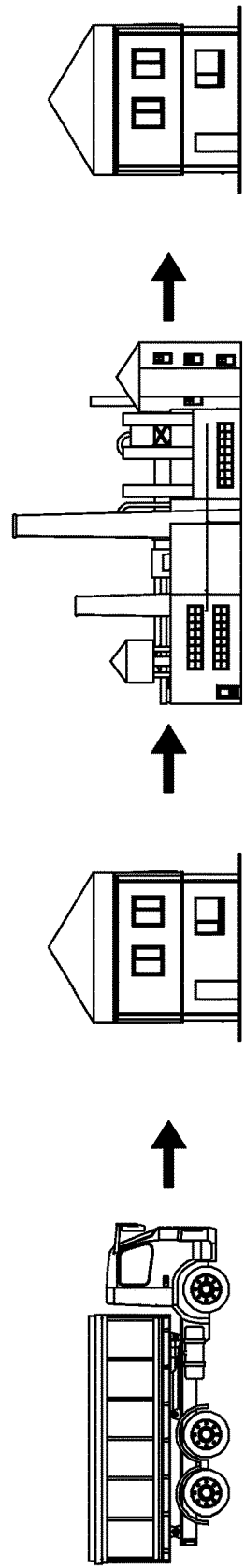

FIG. 6

| 6-1 Transportation stage | * Image similarity recognition method<br>* Storage recognition method<br>* Object recognition method<br>* Object motion recognition method |
|---|---|
| 6-2 Before-treatment temporary storage stage | * Image similarity recognition method<br>* Storage recognition method<br>* Object recognition method |
| 6-3 Disposal stage | * Image similarity recognition method<br>* Object recognition method<br>* Object motion recognition method<br>* Object positioning recognition method |
| 6-4 Before-treatment temporary storage stage | * Image similarity recognition method<br>* Storage recognition method<br>* Object recognition method |

INTELLIGENT MONITORING SYSTEM FOR WASTE DISPOSAL AND METHOD THEREOF

BACKGROUND OF THE INVENTION

1. Field of the Invention

The present invention relates to a monitoring technology for waste disposal, in particular to an outstanding technology capable of effectively monitoring the whole process of waste disposal in order to make sure that all wastes are correctly processed and improve the disadvantages of prior art.

2. Description of the Prior Art

With advance of civilization, many countries in the world are gradually paying more attention to the problems of waste disposal. Further, as life quality of people significantly increases, a large amount of wastes are created accordingly. These wastes not only stink and influence the landscapes of cities, but also pollute environments and result in ecological damages, or even damage humans' health and cause human existence crisis.

Currently, most of countries in the world commission professional waste disposal service providers to recycle and transport wastes so as to perform the final treatment for the wastes or recycle the wastes. The whole waste disposal process is monitored and managed by a specific agency in order to make sure that the whole process conforms to the law requirements.

However, as the amount of wastes are large and the waste disposal process is long, many people need to participate in the process and the waste disposal process needs a lot of time. Thus, if any one of the stages of the waste disposal process goes wrong, the whole waste disposal process would be influenced accordingly and it is very head to find out the problem. For the reason, it is very difficult to punish the person guilty of a dereliction of duty.

The major problem is that there is no a complete monitoring and manage system for the whole waste disposal process, so it is very hard to find out problems even if the staff members want to solve the problems. It is also improper to ask the staff members to manually record the waste disposal process because the effectiveness of manual monitoring is originally low and the records thereof can be easily falsified. Therefore, how to effectively implement the waste disposal process is a chronic problem.

In fact, with advance of technology, the development of automation technology allows the service providers and staff members for monitoring the waste disposal process can easily record the waste disposal process and verify the records. Besides, automation technology can also provide reports for review. However, there is still no an integrated system for monitoring the waste disposal process, so these monitoring devices cannot be properly used. Thus, the waste disposal process still cannot be effectively performed. Therefore, it has become an important issue to develop an effective system with a view to solve the above problems.

Thus, it has become an important issue to develop a new technology in order to solve the above problems.

SUMMARY OF THE INVENTION

In order to solve the problems of prior art, the embodiments of the present invention provides an intelligent monitoring system for waste disposal and the method thereof, which can record each of the operational stages of a waste disposal process in detail, automatically detect abnormal conditions and reduce human errors via a monitoring technology which can be completely controlled in the whole process. Thus, the system and the method thereof according to the embodiments of the present invention can make sure that the waste disposal process is safe and transparent in order to make the waste disposal process conform to the requirements.

Another objective of the present invention is to provide an intelligent monitoring system for waste disposal and the method thereof. More specifically, each of the operational stages is monitored by an automated monitoring mechanism, which can avoid human errors or the data are falsified. Thus, the whole waste disposal process can be more correct.

To achieve the foregoing objective, one embodiment of the present invention provides an intelligent monitoring system for waste disposal, which includes the following operational devices:
 a transport vehicle, configured to transport a waste;
 a disposal station, configured to receive the waste transported by the transport vehicle;
 a camera, installed on any one of the operational devices or installed in the operational path of any one of the operational devices so as to record the video of each of the operational stages, implemented by the operational device corresponding thereto;
 a control module, connected to the camera to control the camera to record the video, transmit the video or capture the image from the video;
 a calculation module, connected to the control module and configured to recognize the image captured by the control module; and
 a sensor, installed on any one of the operational devices or installed in the operational path of any one of the operational devices, and connected to the control module, wherein when an abnormal condition is detected by the sensor, the image captured by the control module is recognized in order to determine whether the abnormal condition actually occurs.

According to the aforementioned system, another embodiment of the present invention further provides an intelligent monitoring method for waste disposal, which includes the following operational stages:
 a transportation stage: loading a transport vehicle with a waste so as to transport the waste to a disposal station, unloading the waste from the transport vehicle and putting the waste in a before-treatment temporary storage zone of the disposal station;
 a disposal stage: putting the waste in the disposal station to process the waste and then moving the waste to an after-treatment temporary storage zone of the disposal station to wait for a subsequent treatment;

Each of the operational stages is provided with a camera and a sensor configured to detect an abnormal condition, wherein the camera records the video of any one of the operational stages in order to capture the image from the video, and determines whether the abnormal condition occurs in any one of the operational stages by recognizing the image or the camera is triggered by the sensor to capture the image from the video so as to determine whether the abnormal condition actually occurs according to the image after the abnormal condition is detected by the sensor.

As described above, the camera can regularly record the video according to a preset timing interval or record the video after being triggered by the sensor. In addition, the camera can determine whether each of the operational stages is being implemented or whether a specific object enters the site of any one of the operational stages via an image recognition method. Then, the camera can be automatically triggered to record the video, capture the image from the video and recognize the image when any one of above events occurs.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 6 is the schematic view illustrating the possible image recognition methods of each of the operational stages of the intelligent monitoring system for waste disposal in accordance with one embodiment of the present invention.

DETAILED DESCRIPTION OF THE PREFERRED EMBODIMENT

The following description is about embodiments of the present invention; however it is not intended to limit the scope of the present invention.

Figure 1:
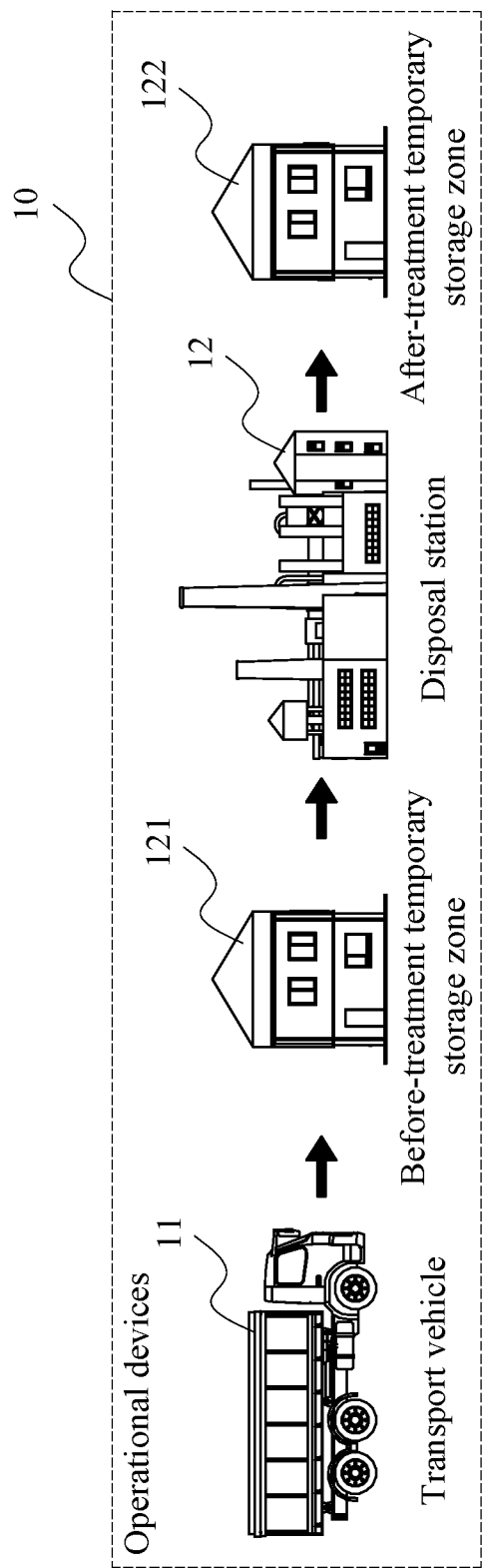
FIG. 1 is the schematic view of the intelligent monitoring system for waste disposal in accordance with one embodiment of the present invention.

Please refer to FIG. 1, which is the schematic view of the intelligent monitoring system for waste disposal in accordance with one embodiment of the present invention. The intelligent monitoring system for waste disposal includes the following operational devices 10:

Transport vehicles 11: the transport vehicles 11 may be garbage trucks, recycle trucks, etc., which are used to transport wastes.

Disposal station 12: the disposition station 12 is used to process the wastes, which is provided with a before-treatment temporary storage zone 121 and an after-treatment temporary storage zone 122. When the transport vehicles 11 are loaded with the wasters, the transport vehicles 11 move to the disposal station 12. Then, the wastes are stored in the before-treatment temporary storage zone 121 first and moved to the disposal station 12 to process the wastes after the inspection of the wastes is finished. After the wastes are processed, the residue would be moved to the after-treatment temporary storage zone 122 after being sorted according to the characteristic, type or processing method thereof. Afterward, the final treatment of the residue would be made by the waste disposal service provider.

Figure 2:
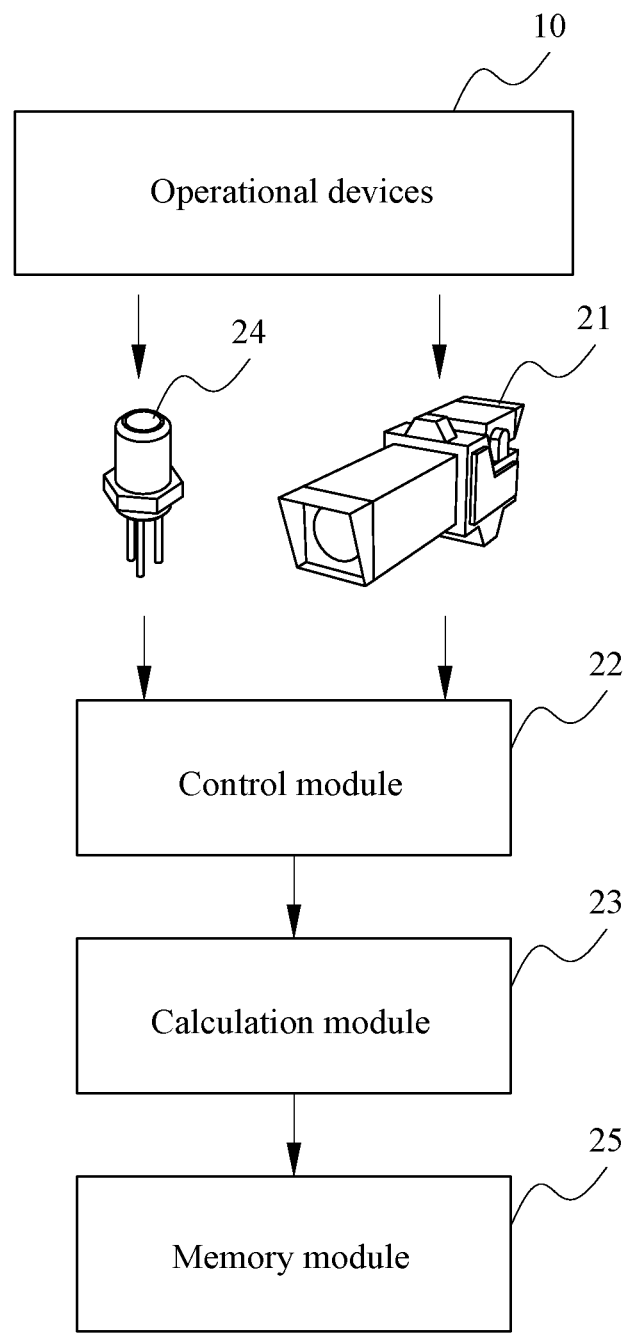
FIG. 2 is the schematic view of the devices for performing the monitoring function of the intelligent monitoring system for waste disposal in accordance with one embodiment of the present invention.

Please refer to FIG. 2, which is the schematic view of the devices for performing the monitoring function of the intelligent monitoring system for waste disposal, cooperating with the operational devices 10, in accordance with one embodiment of the present invention. As shown in FIG. 2, the system includes the following devices for performing the monitoring function:

Cameras 21: the cameras 21 are installed on the operational devices 10 or installed in the operational paths of the operational devices 10 so as to record the videos of each of the operational stages, implemented by the operational device 10 corresponding thereto.

Control module 22: the control module 22 is connected to the camera 21 to control the camera 21 to record the videos, transmit the videos or capture the images from the videos.

Calculation module 23: the calculation module 23 is connected to the control module 22 and used to recognize the images captured by the control module 23.

Sensors 24: the sensors 24 are installed on the operational devices 10 or installed in the operational paths of the operational devices 10, and connected to the control module 22. When an abnormal condition is detected by any one of the sensors 24, the images captured by the control module 22 are recognized in order to determine whether the abnormal condition actually occurs.

The control module 22 can control the cameras 21 to perform full video recording or regularly record the videos, and capture the images of the videos according to the predetermined conditions. Then, the images are transmitted to the calculation module 23 for the calculation module 23 to recognize these images in order to determine whether the abnormal condition occurs.

The sensor 24 may be, but not limited to, RFID tags, fluid level gauges, truck bed lifters, platform scales or other similar devices. The RFID tags or the fluid level gauges are installed on the wastes in order to make sure that the wastes conform to the registration data. The truck bed lifters are installed on the transport vehicles 11 so as to make sure that the transport vehicles 11 are normally loaded/unloaded. The platform scales can be installed at any positions. The sensors 24 may be other types of devices, which can be adjusted according to actual requirements.

In addition, the calculation module 23 is connected to a memory module 25 in order to save the video or the image, such that the videos and the images can be checked afterwards.

The memory module 25 may be a local database or a cloud database with a view to conveniently access the data and prevent the data from being falsified.

Figure 3:
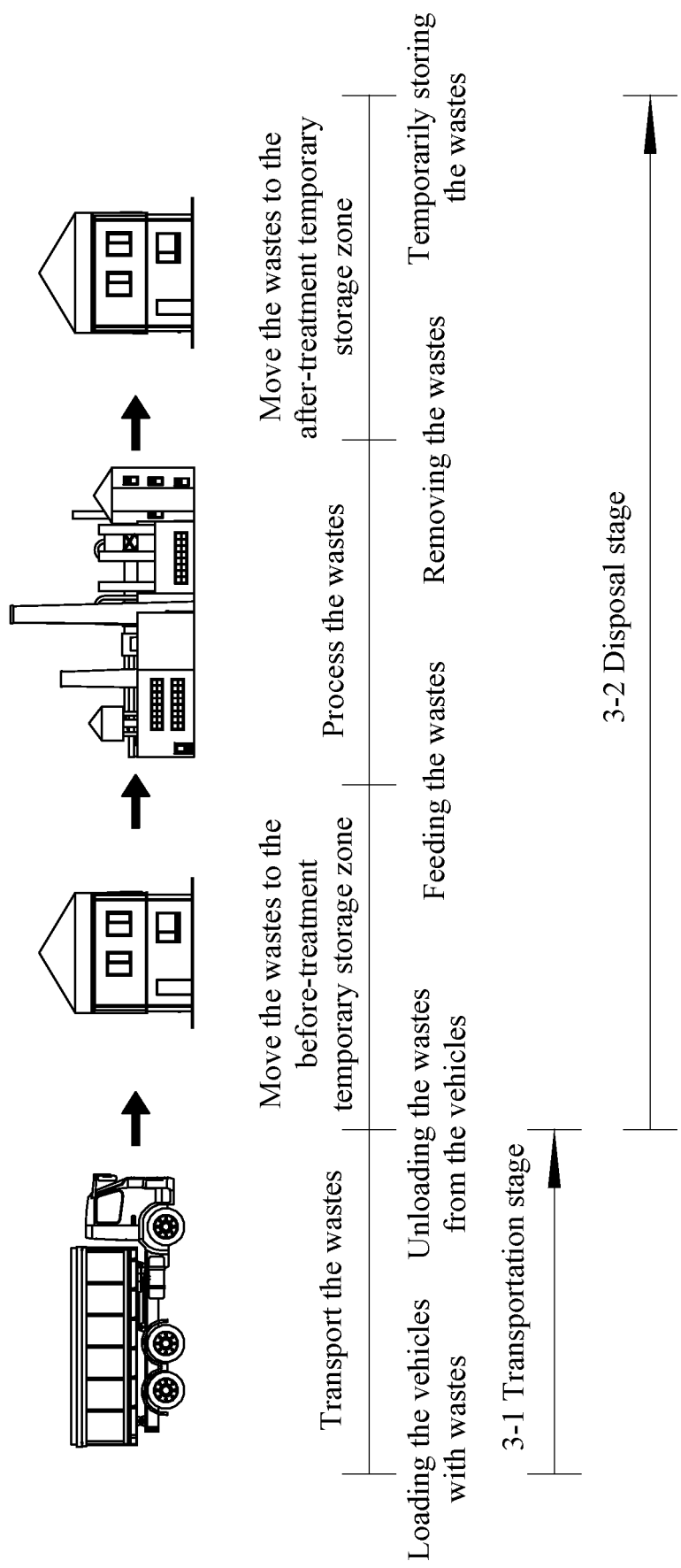
FIG. 3 is the flow chart of the operational stages of the intelligent monitoring system for waste disposal in accordance with one embodiment of the present invention.

Please refer to FIG. 3, which is the flow chart of the operational stages of the intelligent monitoring system for waste disposal in accordance with one embodiment of the present invention. In the embodiment, the intelligent monitoring method for waste disposal includes the following operational stages:

3-1. Transportation stage: sorting and packaging the wastes, and loading the transport vehicles with the wastes so as to transport the wastes to the disposal station; then, unloading the wastes from the transport vehicles and putting the wastes in the before-treatment temporary storage zone of the disposal station.

3-2: Disposal stage: moving the wastes stored in the before-treatment temporary storage zone to the disposal station to process the waste; then moving the waste to the after-treatment temporary storage zone of the disposal station to wait for the subsequent treatment of the waste disposal service provider.

Figure 4:
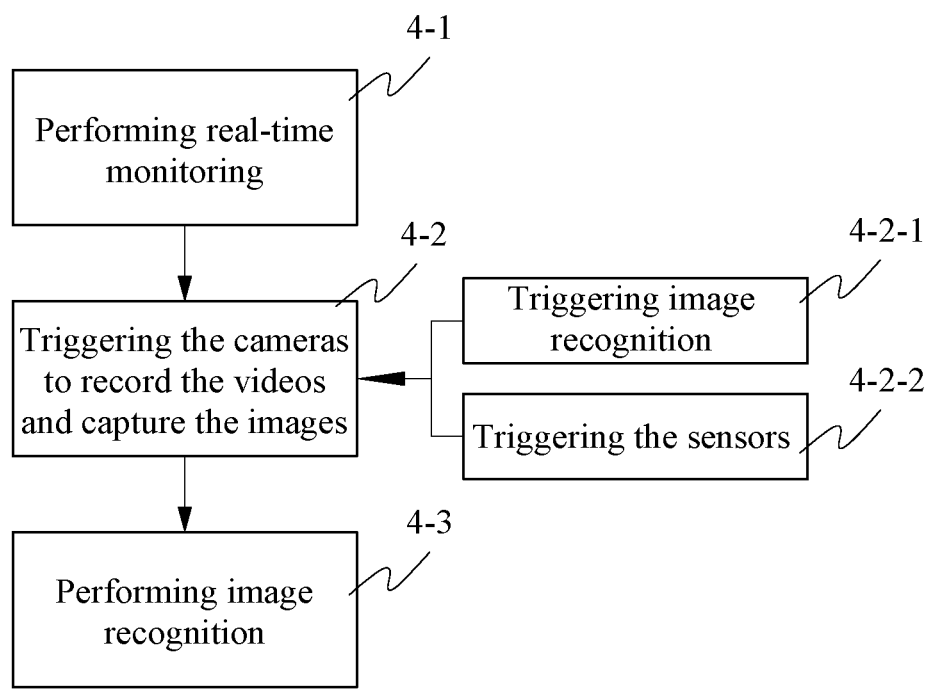
FIG. 4 is the flow chart of the image recognition method of the intelligent monitoring system for waste disposal in accordance with one embodiment of the present invention.

Please refer to FIG. 4, which is the flow chart of the image recognition method of the intelligent monitoring system for waste disposal in accordance with one embodiment of the present invention. In the embodiment, the intelligent monitoring method for waste disposal includes the following monitoring steps for the aforementioned operational stages:

4-1: performing real-time monitoring for the operational stages by the cameras installed in the sites of the operational stages.

4-2: capturing the images from the videos obtained by monitoring the operational stages in order to recognize the images, or monitoring the operational stages by the sensors installed in the sites of the operational stages; when the image recognition result or the sensors detect that the operational stages (loading, unloading, feeding, etc.) are being implemented, the cameras are triggered to record the videos (the cameras generate the time stamps for the relevant videos and automatically editing the videos corresponding to the operational stages according to the time points marked in the time stamps) so as to captures the images from the videos.

4-3: executing image recognition for the operational stages in order to confirm whether the abnormal condition occurs in the operational stages.

The cameras regularly capture the images from the videos to recognize the images according to a preset timing interval so as to determine whether the abnormal condition occurs.

Alternatively, the cameras are set to capture the images from the videos when the operational stages proceed to the necessary locations so as to determine whether the abnormal condition occurs.

Figure 5:
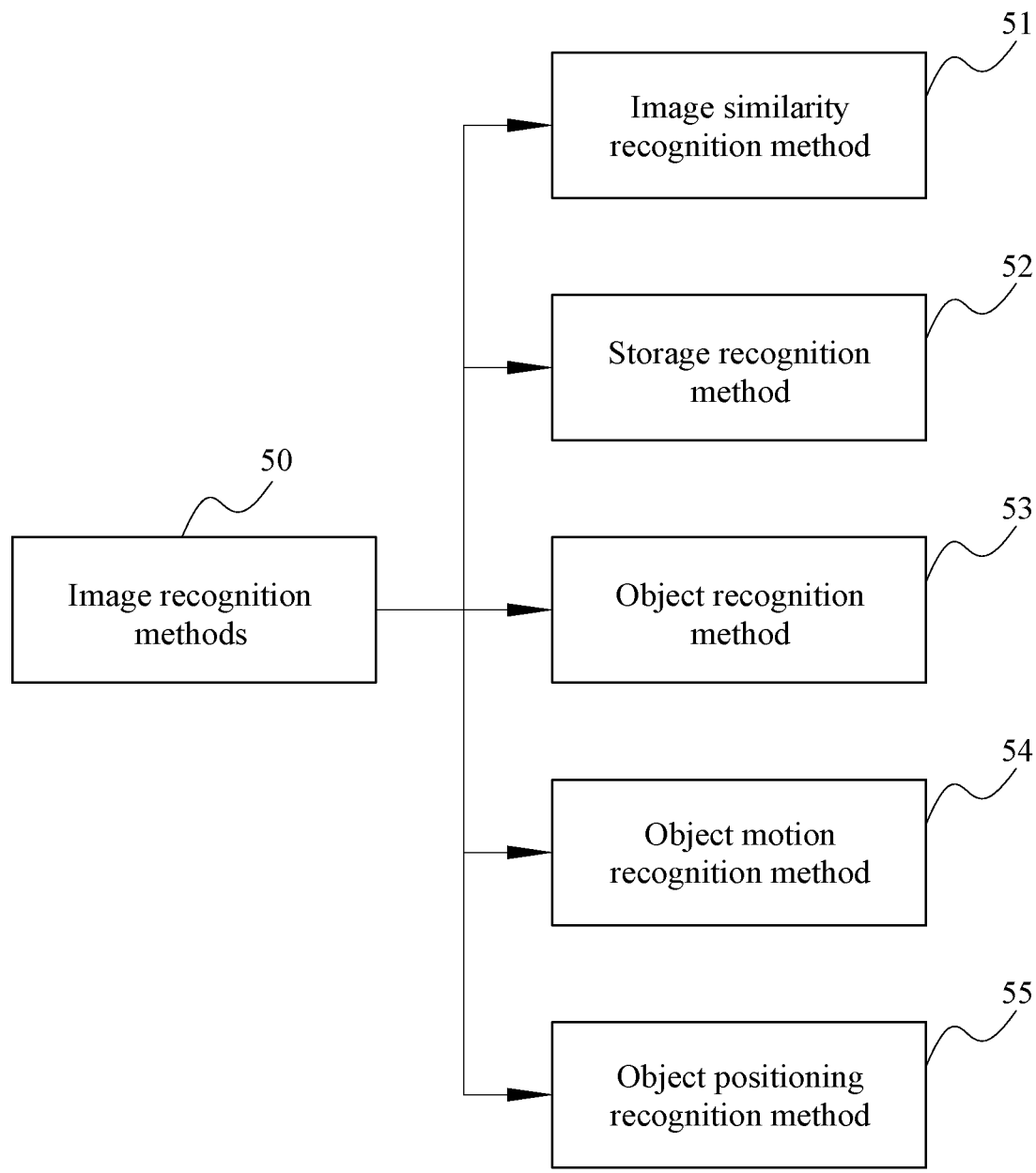
FIG. 5 is the schematic view illustrating several possible image recognition methods of the intelligent monitoring system for waste disposal in accordance with one embodiment of the present invention.

Please refer to FIG. 5, which is the schematic view illustrating several possible image recognition methods of the intelligent monitoring system for waste disposal in accordance with one embodiment of the present invention. The image recognition methods used in the embodiment according to the present invention may be:

Image similarity recognition method 51: analyzing the images via an algorithm for similarity comparison to determine whether the contents of the images are abnormal in order to confirm whether the abnormal condition occurs in the operational stages.

Storage recognition method 52: calculating the weights of the wastes according to the shapes of the wastes in order to make sure that mass balance is achieved.

Object recognition method 53: recognizing the objects, such as persons, machines, the wastes or other products, in the images and further recognizing the types of the objects (e.g., different types of wastes or products).

Object motion recognition method 54: recognizing the motions of the persons or the machines in the images in order to determine whether the motions conform to the operations of the operational stages.

Object positioning recognition method 55: recognizing the positions of the persons or the machines in the images in order to determine whether the operational positions or the operational paths of the operational stages are correct.

Moreover, as described in the operational stage 4-2, the camera can be regularly triggered according to a preset timing interval. Besides, the camera can also be triggered by the following methods:

4-2-1: the camera can be triggered by image recognition. The camera can determine whether the operational stages are being implemented or determine whether a specific object enters the sites of the operational stages according to the image recognition methods shown in FIG. 5. If any one of the above situations happens, the camera can be automatically triggered to record the videos in order to capture the images from the videos and then recognize the images.

4-2-2: The camera can be triggered by the sensors so as to determine whether a specific object enters the sites of the operational stages, whether a specific equipment is activated, or whether the operational stages are being implemented? If any one of the above situations occurs, the camera can be automatically triggered to record the videos and capture the images from the videos to recognize the images so as to determine whether the abnormal conditions take place.

Please refer to FIG. 6, which is the schematic view illustrating the possible image recognition methods of each of the operational stages of the intelligent monitoring system for waste disposal in accordance with one embodiment of the present invention. The operational stages may need different image recognition methods because of different requirements, as follows:

6-1. Transportation stage: image similarity recognition method, storage recognition method, object recognition method and object motion recognition method are executed.

6-2. Before-treatment temporary storage stage: image similarity recognition method, storage recognition method and object recognition method are executed.

6-3. Disposal stage: image similarity recognition method, object recognition method, object recognition method, object motion recognition method and object positioning recognition method are executed.

6-4. Before-treatment temporary storage stage: image similarity recognition method, storage recognition method and object recognition method are executed.

The embodiment is just for illustration instead of limitation. The types of the recognition methods used in each of the stages can be changed or increased according to actual requirements.

The above disclosure is related to the detailed technical contents and inventive features thereof. Those skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An intelligent monitoring method for waste disposal, comprising following operational stages:

a transportation stage: loading a transport vehicle with a waste so as to transport the waste to a disposal station, unloading the waste from the transport vehicle and putting the waste in a before-treatment temporary storage zone of the disposal station;

a disposal stage: putting the waste in the disposal station to process the waste and then moving the waste to an after-treatment temporary storage zone of the disposal station to wait for a subsequent treatment;

wherein each of the operational stages is provided with a camera and a sensor configured to detect an abnormal condition, wherein the camera records a video of any one of the operational stages in order to capture an image from the video and determines whether the abnormal condition occurs by recognizing the image, or the camera is triggered by the sensor to capture the image from the video so as to determine whether the abnormal condition actually occurs according to the image after the abnormal condition is detected by the sensor;

wherein a control device controls the sensor and the camera to record the video and transmits the video, a calculation device is connected to the control device to recognize the image; the sensor is a RFID tap, a fluid level gauge, a truck bed lifter or a platform scale; the RFID tag or the fluid level gauge is installed on the waste in order to make sure that the waste conforms to registration data; the truck bed lifter is installed on the transport vehicle so as to make sure that the transport vehicle is normally loaded/unloaded; the platform scales can be installed at any position;

wherein a disposition station is provided with the before-treatment temporary storage zone and the after-treatment temporary storage zone, when the transport vehicle is loaded with the waste, the transport vehicle moves to the disposal station, then, the waste is stored in the before-treatment temporary storage zone first and moved to the disposal station to process the waste after an inspection of the waste is finished, after the waste is processed, a residue is moved to the after-treatment temporary storage zone;

wherein the control device determines, via an image recognition method, whether each of the operational stages is implemented, the sensor is configured to determine whether a specific object enters the sites of any one of the operational stages, whether a specific device is activated or whether any one of the operational stages is implemented, and the camera is automatically triggered by the sensor so as to record the video, capture the image from the video and recognize the image, wherein the image recognition method includes:

an image similarity recognition method: analyzing the image via an algorithm for similarity comparison to determine whether contents of the image are abnormal in order to confirm whether the abnormal condition occurs in the operational stages;

a storage recognition method: calculating a weight of the waste according to a shape of the waste in order to make sure that a mass balance is achieved;

an object recognition method: recognizing the specific object in the image and further recognizing a type of the specific object as a person or a machine;

an object motion recognition method: recognizing motions of the person or the machine in the image in order to determine whether the motions conform to operations of the operational stages; and an object positioning recognition method: recognizing a position of the person or the machine in the image in order to determine whether operational positions or operational paths of the operational stages are correct.

2. The intelligent monitoring method for waste disposal of claim 1, wherein the camera regularly captures the image from the video according to a preset timing interval so as to determine whether the abnormal condition occurs.

3. The intelligent monitoring method for waste disposal of claim 1, wherein the camera is set to capture the image from the video when any one of the operational stages proceeds to a necessary location so as to determine whether the abnormal condition occurs.

4. An intelligent monitoring system for waste disposal, comprising following operational devices:

a transport vehicle, configured to transport a waste;

a disposal station, configured to receive the waste transported by the transport vehicle; wherein a disposition station is provided with a before-treatment temporary storage zone and an after-treatment temporary storage zone, when the transport vehicle is loaded with the waste, the transport vehicle moves to the disposal station, then, the waste is stored in the before-treatment temporary storage zone first and moves to the disposal station to process the waste after an inspection of the waste is finished, after the waste is processed, a residue is moved to the after-treatment temporary storage zone;

a camera, installed on any one of the operational devices or installed in an operational path of any one of the operational devices so as to record a video of each of the operational stages, implemented by the operational device corresponding thereto;

a control device, connected to the camera to control the camera to record the video, transmit the video or capture an image from the video;

a calculation device, connected to the control device and configured to recognize the image captured by the control device; and a sensor, installed on any one of the operational devices or installed in the operational path of any one of the operational devices, and connected to the control device, wherein when an abnormal condition is detected by the sensor, the image captured by the control device is recognized in order to determine whether the abnormal condition actually occurs, the sensor is a RFID tag, a fluid level gauge, a truck bed lifter, or a platform scale, the RFID tag or the fluid level gauge is installed on the waste in order to make sure that the waste conforms to registration data, the truck bed lifter is installed on the transport vehicle so as to make sure that the transport vehicle is normally loaded/unloaded, and the platform scales can be installed at any positions.

5. The intelligent monitoring system for waste disposal of claim 4, wherein the calculation device is connected to a memory device in order to save the video or the image.

* * * * *